US012366758B1

(12) United States Patent
Lockhart

(10) Patent No.: US 12,366,758 B1
(45) Date of Patent: Jul. 22, 2025

(54) DIGITAL IMAGE DISPLAY MASK

(71) Applicant: Brian Lockhart, Yelm, WA (US)

(72) Inventor: Brian Lockhart, Yelm, WA (US)

(*) Notice: Subject to any disclaimer, the term of this patent is extended or adjusted under 35 U.S.C. 154(b) by 0 days.

(21) Appl. No.: 18/607,453

(22) Filed: Mar. 16, 2024

Related U.S. Application Data

(60) Provisional application No. 63/453,133, filed on Mar. 19, 2023.

(51) Int. Cl.
G09G 5/00 (2006.01)
G02B 27/01 (2006.01)
G10L 13/033 (2013.01)

(52) U.S. Cl.
CPC ....... *G02B 27/0179* (2013.01); *G02B 27/017* (2013.01); *G10L 13/033* (2013.01); *G02B 2027/0138* (2013.01); *G02B 2027/0145* (2013.01)

(58) Field of Classification Search
CPC .............. G02B 27/01; G02B 27/0101; G02B 27/0138; G02B 27/0145; G02B 27/017; G02B 27/0172; G02B 27/0179; G10L 13/033
See application file for complete search history.

(56) References Cited

U.S. PATENT DOCUMENTS

| 8,899,242 | B2* | 12/2014 | Wong | A45D 44/00 |
| | | | | 132/218 |
| 9,798,144 | B2* | 10/2017 | Sako | G06F 3/013 |
| 10,114,610 | B2* | 10/2018 | Sendai | G06T 19/006 |
| 10,719,950 | B2* | 7/2020 | Kawamoto | G02B 27/0179 |
| 11,435,970 | B2* | 9/2022 | Feng | G09F 21/026 |
| 11,644,678 | B1* | 5/2023 | Castleman | G01L 19/14 |
| | | | | 345/8 |
| 2015/0348322 | A1* | 12/2015 | Ligameri | G02B 27/017 |
| | | | | 345/633 |
| 2016/0035351 | A1* | 2/2016 | Sendai | G02B 27/017 |
| | | | | 704/275 |
| 2018/0158246 | A1* | 6/2018 | Grau | G06T 3/18 |
| 2019/0019508 | A1* | 1/2019 | Rochford | G06F 3/013 |

FOREIGN PATENT DOCUMENTS

| JP | 2012203128 A | * 10/2012 | ......... G02B 27/0093 |
| JP | 2018042004 A | * 3/2018 | |

* cited by examiner

*Primary Examiner* — Joe H Cheng
(74) *Attorney, Agent, or Firm* — Tiburon Intellectual Property PLLC

(57) ABSTRACT

One embodiment of the present invention provides a wearable mask with an uninterrupted external digital display, wherein a processor receives external inputs to change the mask or image that is displayed, external cameras that capture real-time images to be displayed via an internal view screen, where the processor receives inputs from the mask wearer that change the mask display in response to the wearer inputs, and with external speakers that respond to input from the wearer.

20 Claims, 5 Drawing Sheets

DIGITAL IMAGE DISPLAY MASK

CROSS-REFERENCE TO RELATED APPLICATION

This application claims priority benefit of U.S. Provisional Patent Application No. 63/453,133 entitled "Digital Image Display Mask," filed Mar. 19, 2023. The disclosure in that application is incorporated herein in its entirety.

BACKGROUND AND SUMMARY

The present invention relates generally to ornamental face masks and more particularly to dynamic LED Halloween face masks that have screens with changeable mask displays.

Face masks currently exist that have a changeable display on their external surface. These masks have different limitations. First, they are not externally programmable (have limited external programming) with new masks to display. Second, they either offer a fixed face display, or they change in a limited programmed way—they do not respond to inputs from the wearer. Third, they may not provide speakers for the person's voice to be heard. Finally, the current masks often have eye holes in the display for the wearer to see, which interrupts the effect of the displayed face. The present disclosure seeks to address one or more of these shortcomings.

The present invention provides for various unique aspects that add to the prior art. The disclosure may provide for external input of new faces, or other images, to use with the digital display. It may provide for a processor and sensor input to change the face in response to input from the wearer. It may also provide a speaker so that people can hear the wearer's voice. And, it may provide an external/internal vision system for the wearer so that eye holes are not necessary and the digital display can display one contiguous mask.

As a non-limiting example, the present invention provides a wearable mask with an uninterrupted external digital display, wherein a processor receives external inputs to change the mask or image that is displayed, external cameras that capture real-time images to be displayed via an internal view screen, where the processor receives inputs from the mask wearer that change the mask display in response to the wearer inputs, and with external speakers that respond to input from the wearer.

DETAILED DESCRIPTION

Figure 1:
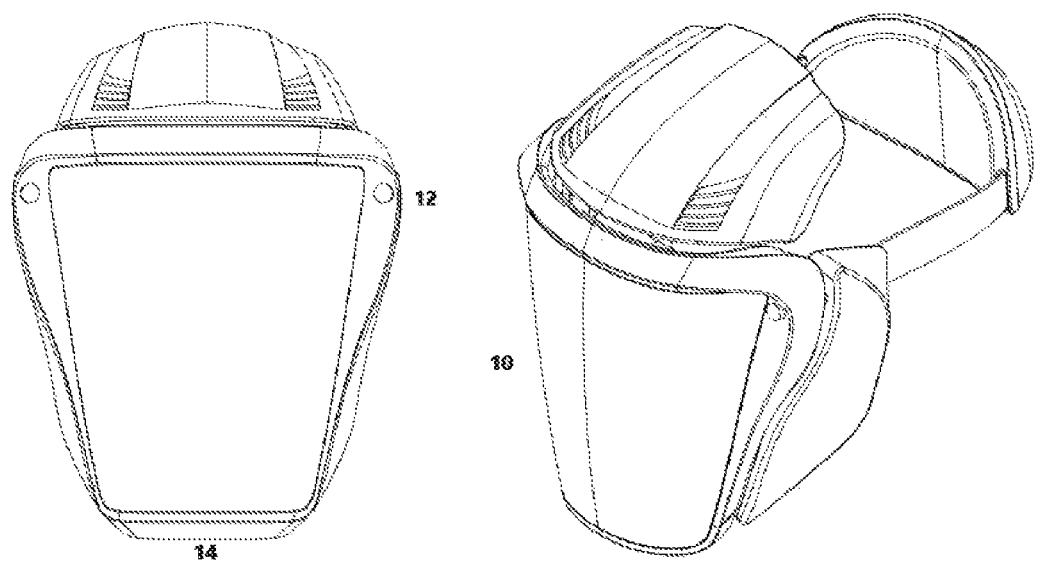
FIG. 1 shows the exterior of an embodiment of the disclosed face mask.

While the exemplary embodiments illustrated herein may show various features, it will be understood that the different features disclosed herein can be combined variously to achieve the objectives of the present invention.

The preferred embodiment of the present invention may include a wearable face mask that attaches to a wearer's head. As defined in this disclosure, mask could mean a face mask, headgear, helmet, headwear, or any combination of the above. On the external, visible surface of the mask, a digital display may be attached to the face mask. Face mask here refers to the external surface, or face plate of the mask, although the "face" on the exterior of the mask could also be any sort of image the user wishes to display. In a preferred embodiment, the display may be an LED display, such as that used by TV's or smartphones, but can also be any other type of display technology known in the art, including, but not limited to, LCD, OLED, QLED, or similar display technologies. The mask may further include a processor that controls the display, connected to a power source, such as a battery. The battery may also power the display, or other integrated aspects of the system. The processor may provide several functions. First, the processor may interact with memory that contains the files for the mask to be displayed. Second, the processor may work with the mask or image file and process it for display of the desired mask onto the display. Third, the processor may work with a graphics processor for higher resolution images on the display. Fourth, the processor may interact with an audio processor for microphone, speakers, and audio files. The processor may also operate the external camera and internal view screen.

In another embodiment, the processor may also receive inputs from the user. These inputs may include inputs that select the mask or image file to be displayed. However, the inputs may also be sensor inputs that modify the selected mask itself. These inputs are described further below.

In a variation of the present invention, the processor 30 and memory (not show) may receive external input signals for control and programming of the mask to be displayed. For example, the mask may connect to an external source that has access to a new type of mask the user wants to display or run. The external source may be a smartphone, cloud service, or any other source of image or mask files. The user may select this new mask file, then direct it to be loaded into the mask memory. This could also be accomplished by inserting a memory module into the mask, such as a micro-SD card or other similar memory storage device known in the art, and having the file copied into the memory in the mask. However, in a variation of this embodiment, the mask processor could further include a wireless transmitter module, such as a Bluetooth transmitter, or other transmission technology known in the art. Then, the mask could communicate wirelessly with an external device. This device could be a smartphone, but could also be any other type of computer device. Then, the user could go to a website, or to an app related to the mask, then select the desired mask file to use, transmit it to the mask, and select it for use in the mask—all from the smartphone app. The smartphone app may also include other configuration options and features for control of the mask.

In yet another variation of the preferred embodiment, additional inputs to the processor may include control inputs to change the appearance of the mask file selected. One non-limiting type of example of this control is the movement of the mouth. For example, a visual sensor may be placed on the interior of the mask in the area of the wearer's mouth. This visual sensor could be a camera, or any other suitable type of motion sensor. When the person opens their mouth, the sensor would sense the movement, then send that signal to the processor. The processor would then output a signal to the display to open the mouth of the mask on the display. In this way, the mask may use sensor inputs to change the mask mouth to mimic and synchronize the movement of the wearer's mouth. There may be a variety of sensor inputs and types of mask motions to control. For example, the processor may also take input from an audio sensor, such as a microphone, to control the movement of the mouth to mimic the motion of the wearer's mouth. The mask may also use a combination of sensor inputs, such as a camera, microphone, and other types of sensors, to effect mask display change in response to inputs from the wearer. Further, there are a variety of different facial motions and features that may be mimicked. Non-limiting examples include, but are not limited to, a camera that would sense movement and direction of the eyes, a camera that senses blinking, a sensor that senses smiling, a camera that senses eyebrow motion, or any combination of these, or other possible inputs from the face.

In another variation of the preferred embodiment, the display may be one, uninterrupted external display, with no eye holes or other type of interruption in the display. In this embodiment, the wearer would have no way to see through the mask, but this embodiment may provide internal displays facing the wearer's eyes, connected to an external camera on the mask. Then, the wearer could view the external view captured by the camera, and provide it to the wearer on the internal displays, so that the user may see where (he or) she is walking, while providing a continuous mask, with no interruptions to the external viewer of the mask.

Turning to FIG. 1, this figure shows an embodiment of the exterior of the wearable mask. The mask has an external display 10. One embodiment disclosed above includes an external camera 12, which gives an external view to the wearer behind the mask. Also, an external speaker 14 is shown.

Figure 2:
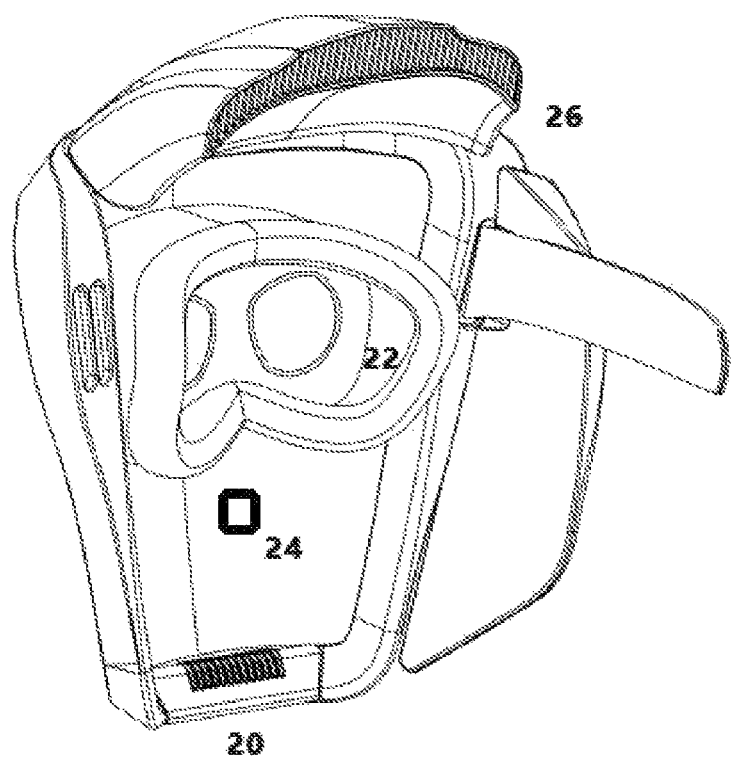
FIG. 2 shows the interior of an embodiment of the disclosed face mask.

Turning to FIG. 2, this figure shows an embodiment of the interior of the wearable mask. In this embodiment, there is a microphone 20. An internal display 22 is provided to give the wearer a view of the outside environment provided by the external camera 12. In this optional embodiment, a sensor 24 determines the movements of the wearer's face. Then, the movement of the wearer's face is used to move the facial image correspondingly on the external display. This could be a variety of different optical sensors known in the art. However, in an alternative embodiment, the movement of the wearer's mouth could be determined by voice input to the microphone. This could also be determined using a combination of these two sources to more accurately move the mask image on the external display. Also, the processor system 26, and associated sub-modules, are contained within the mask.

In another embodiment of the present invention, the mask may also include a microphone 20 and external speakers 14 connected to the processor. In this embodiment, the wearer may speak into the microphone 20, and the mask file may also include a type of voice associated with the mask or image file. Therefore, in any of the above embodiments, the mask or image file may be an audio aspect associated with the mask file. The processor 26 may then take the voice input, modify it according to the modification specified in the mask file, then send this modified voice output to the external speakers. This may provide additional effect with a given mask. As a non-limiting example, a mask file may give an external display of a wolfman, which may mimic the facial movements of the user, but also provide the voice of the wolfman, given any voice input from the wearer.

In a modification of this embodiment, the facial movements of the mask displayed on the external display may be modified by input taken from a visual sensor that determines the facial movements of the wearer. This sensor may be a variety of different suitable sensors. However, the image may also be modified in different means. For example, the movement of the wearer's mouth may be modified by voice input to the microphone. Or, it may be a combination of the microphone signal and a visual sensor, to improve the accuracy of the movement of the displayed image, so that it better represents the actual facial movements of the wearer.

In yet another embodiment of the present invention, the various sensor inputs may need to be trained to adapted to the particular mouth, face, voice, or other types of inputs from the user. In that case, the software operating in the memory of the mask, connected to the processor, may also include machine learning algorithms that train the mask display to the inputs of a particular user. As one non-limiting example, the software may take camera inputs that indicate when the mouth is opening to speak a certain word. However, the microphone may be hearing a different word for output to the external speakers. In that case, the machine learning algorithms may reconcile or fuse these inputs into what the software calculates as the most correct possible results. Then, the software may train itself to the wearer's facial patterns or voice patterns, to more accurately predict the correct display output to send to the display.

It is further noted that in the use of mask and image files above, that a mask can include a traditional facial image, but can also be different types of images of people, animals, avatars, creatures, colors, or graphics. However, these images can also by dynamic, including jump scares, animations, or other features that can be controlled by the facial movements, or other prompts from the wearer of the mask.

Similarly, the voice files described above can also include different types of audio programs beyond simple voice changing. These could include sounds, pulsations, sound effects, Audiogram waveform generators, or any other type of audio feature. These audio files may be controllable via prompts from the user, including, but not limited to, a voice prompt.

In another embodiment of the system, the screen may be transparent, semi-transparent, or one-way transparent. Some recent display screen technologies use transparent OLED technologies, so that a person can see through the screen while still viewing displayed images. This technology may be integrated into the mask of this disclosure by leaving the eyes transparent so that the wearer can look through the display, while the rest of the mask may display the desired mask image. This is one possible use of the transparent mask, but other usages are also possible. For example, it may be possible to use a double-sided display, so that the mask image is displayed on the exterior surface, and the inside surface at the eyes shows an external view from the camera mounted on the outside of the mask. Therefore, the wearer can see a view "through" the mask on the interior display, while the exterior display shows the desired mask file.

Figure 3:
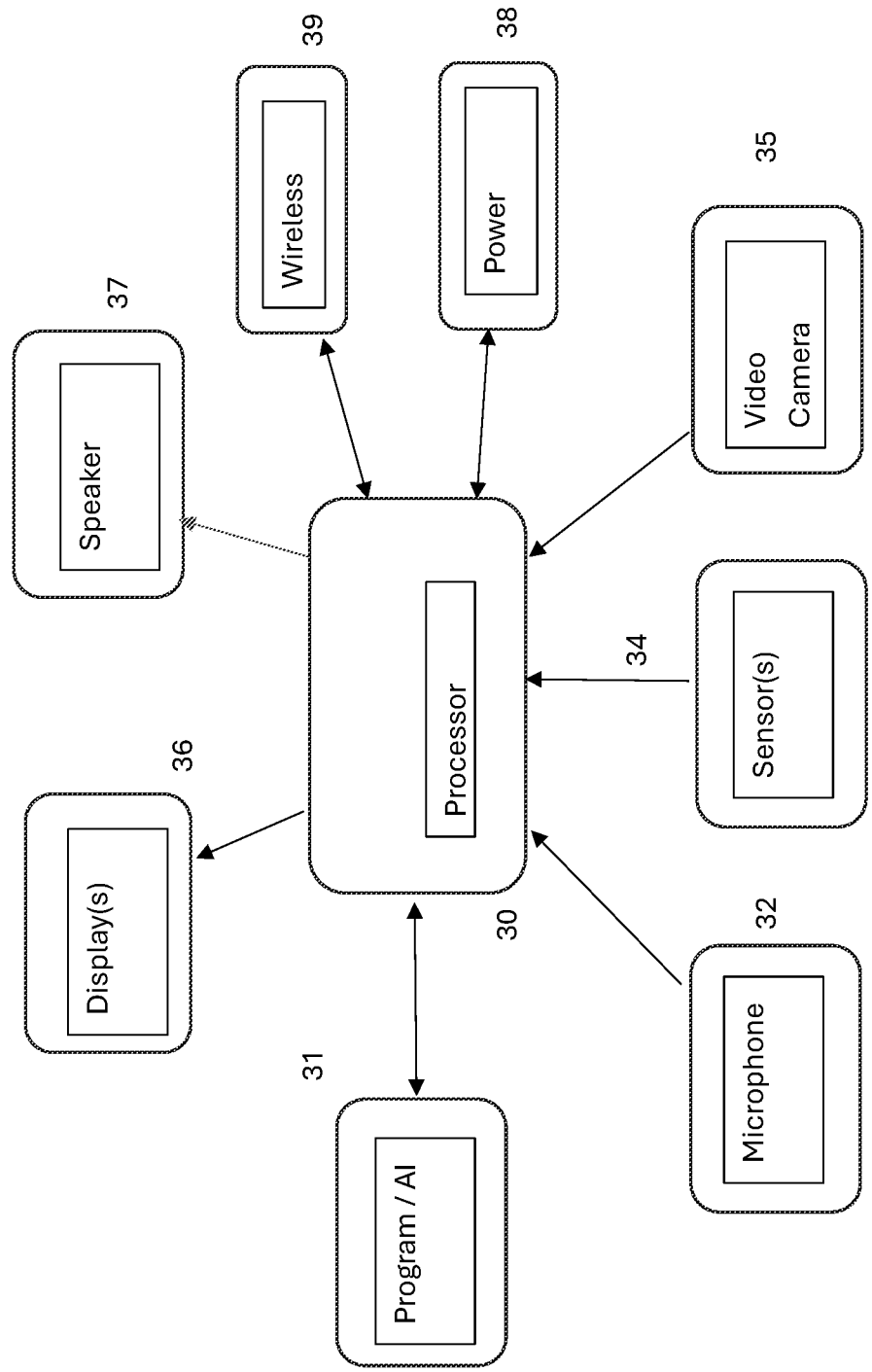
FIG. 3 shows an embodiment of the inputs and outputs of the processor of one embodiment of the disclosed system.

Turning to FIG. 3, this figure shows an embodiment of the processor system of the system discussed above. The processor 30 receives inputs and provides outputs. In this embodiment, the processor 30 may receive instructions from a program/Artificial Intelligence (A) module 31, input from a microphone 32, input from facial movement sensors 34, and input from an external video camera, 35. The processor may then provide output to displays, 36, which may include the external display of the mask, 10, or an internal display, 22. Output may also be given to an external speaker, 37. Further wireless signals may be sent and received from the wireless module, 39. And, power is supplied from a power source, 38.

Figure 4:
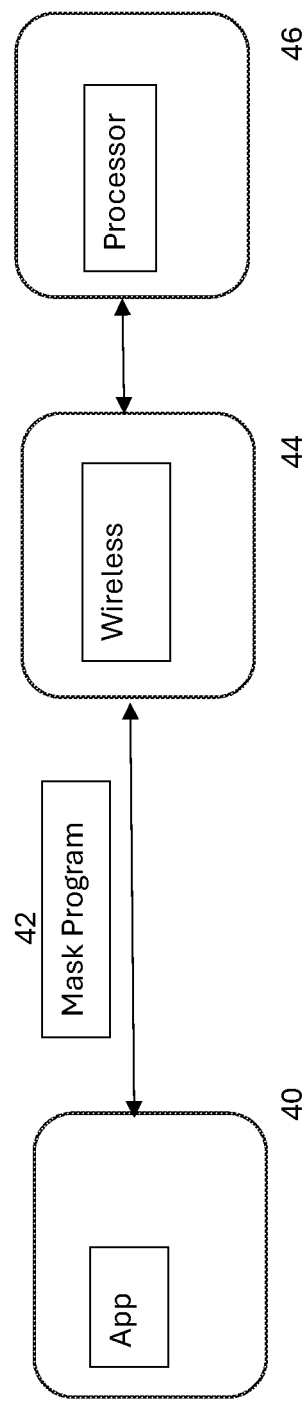
FIG. 4 shows an embodiment of the interaction between an app and an embodiment of the mask in the disclosed system.

Turning to FIG. 4, this figure shows one embodiment of the interaction between an external app 40 and the wearable mask system. In this embodiment, the app 40 may send and receive signals to the mask program 42 via a wireless interface in the mask 44. The wireless interface 44 may then send and receive signals with the processor 46. In this way, the external app 40 may be used to modify the program, and ultimately the instructions of the processor 46, to affect the function of the wearable mask. This may include the type of mask image shown on the external display, the type of voice modification used with the external speaker, combinations of these two, or any other attributes that would be desirable for the user to control or modify.

In yet another embodiment of the mask system, the processor and software of the system could be stored on an external device, of in the app 40, and streamed wirelessly to the wearable mask. In this case, the wearable mask would only house the wireless system 44, and external display 10, as possibly a display controller, and the app 40 may stream the displayed image directly to the mask.

Figure 5:
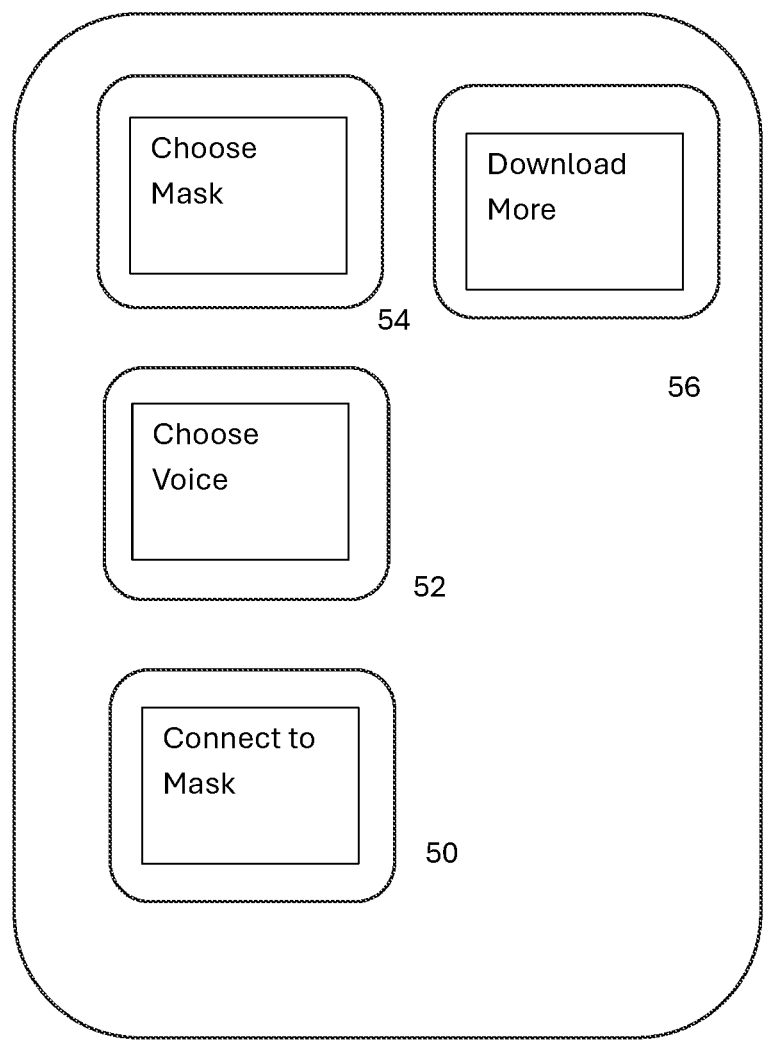
FIG. 5 shows one embodiment of an app in the disclosed system.

Turning to FIG. 5, this figure shows one embodiment of the external app. In this embodiment, the app provides a way to connect to the wearable mask, 50. It provides the ability to choose a specific mask 54 to select for display on external display 10. It also provides the ability to choose a specific voice to 52 to play through the external speaker 14. It also provides the capability to download more masks or voices 56 from an external source (not show). This is not intended to be an exhaustive list of capabilities and controls that the app may provide.

Any combination of the above features and options could be combined into a wide variety of embodiments. It is, therefore, apparent that there is provided in accordance with the present disclosure, improved face mask display systems. While this invention has been described in conjunction with a number of embodiments, it is evident that many alternatives, modifications, and variations would be, or are apparent to, those of ordinary skill in the applicable arts. Accordingly, applicants intend to embrace all such alternatives, modifications, equivalents and variations that are within the spirit and scope of this invention.

The invention claimed is:

1. A face mask configured to secure to a face of a user and providing dynamic external graphics, the face mask comprising:
   an outer surface and an inner surface;
   an external display attached to said outer surface;
   a processor in communication with said external display;
   memory in communication with said processor for storing at least one program;
   a wireless interface in communication with said processor for transferring one or more programs into said memory from an external source;
   a power source mounted to said outer surface or said inner surface and powering said processor; and
   at least one sensor mounted to said inner surface, wherein said at least one sensor is operable to sense a movement of the face of the user, and wherein said at least one sensor is configured to be in communication with said processor such that said at least one program uses an output of said at least one sensor to modify an image displayed on said external display.

2. The face mask of claim 1, wherein said at least one program is configured to at least allow the user of the face mask to change an image displayed on said external display, wherein the image is received from an image file stored in said memory.

3. The face mask of claim 2, wherein said at least one sensor measures a movement of a mouth of the user and said at least one program uses an output of said at least one sensor to modify said external display such that a mouth associated with the image displayed on said external display moves in response to a movement of the mouth of the user of the face mask.

4. The face mask of claim 2, further comprising:
   a speaker attached to said inner surface or outer surface of the face mask; and
   a microphone attached to said inner surface of the face mask, wherein the processor in conjunction with at least one program transmits a modified version of a voice output from the user from said microphone to said speaker.

5. The face mask of claim 4, wherein said at least one program uses an output of the microphone to modify said external display such that a mouth associated with the image displayed on said external display moves in response to a voice input into said microphone from the user of the face mask.

6. The face mask of claim 4, wherein said at least one program modifies a voice output of the user of the face mask resulting in a modified voice output, wherein the modified voice output is transmitted to said speaker.

7. The mask of claim 1, further comprising:
   a video camera coupled to said on the outer surface of said face mask and in communication with said processor; and
   an internal display on the inner surface of said face mask, wherein the internal display is operable to display images to the user of the face mask and wherein the internal display is in communication with said processor,
   wherein said at least one program transfers an output of said video camera to an input of the internal display to allow the user of the face mask to view an external environment outside of the face mask.

8. The face mask of claim 7, wherein the face mask comprises no eye openings, and wherein said external display covers the face of the user.

9. The face mask of claim 1, wherein the wireless interface comprises a wireless transmitter module in communication with said processor, and wherein said wireless transmitted module provides external communication capability to said face mask.

10. The face mask of claim 9, further comprising an external application configured on an external device in communication with said wireless interface, wherein the user of the face mask can use said external application to modify said at least one program in said face mask.

11. The face mask of claim 1, wherein said at least one program further comprises an artificial intelligence module, wherein said artificial intelligence module further interprets the output of said at least one sensor such that said external display more accurately corresponds to the movement of the face of the user.

12. A face mask configured to secure to a face of a user and providing dynamic external graphics, the face mask comprising:
- an outer surface and an inner surface;
- an external display attached to the outer surface;
- a processor in communication with said external display;
- memory in communication with said processor for storing at least one program;
- a wireless interface in communication with said processor for transferring programs into said memory from an external source;
- a power source mounted to said outer surface and inner surface and configured for powering said processor;
- a speaker; and
- at least one sensor mounted to said inner surface, wherein said at least one sensor is operable to sense movement of the face of the user, and said at least one sensor is in communication with said processor such that said at least one program uses an output of said at least one sensor to modify a signal sent to said external display.

13. The face mask of claim 12, wherein said at least one sensor is a microphone, and a signal from said microphone is used to modify a movement of a mouth associated with an image displayed on said external display.

14. The face mask of claim 12, wherein at least one sensor is operable to detect facial movements of the user and an output signal of said at least one sensor is used to modify a movement of an image of a face displayed on said external display.

15. The face mask of claim 12, wherein:
- at least one sensor is a microphone, and an output signal of said microphone is used to modify a movement of an image displayed on said external display, wherein said image comprises a mouth that moves in response to said output signal of said microphone; and
- at least one sensor is used to detect facial expressions and an output signal of said at least one sensor used to detect facial expressions is used to modify the movement of the mouth displayed on said external display.

16. A face mask configured to secure to the face of a user and
providing dynamic external graphics, the face mask comprising:
- an interior surface and an exterior surface;
- an external display attached to the exterior surface of said face mask;
- a processor in communication with said external display;
- memory in communication with said processor for storing at least one program;
- a wireless interface in communication with said processor;
- a power source mounted to said exterior surface or said interior surface and powering said processor;
- a speaker attached to said exterior surface;
- at least one sensor mounted to the interior surface of said face mask configured to sense movement of said user of the face mask, and in communication with said processor such that said at least one program uses an output of said at least one sensor for modifying a signal sent to said external display such that an image displayed on said external display moves in response to a facial movement of the user of the face mask; and
- an external application in communication with said wireless interface, wherein the user of the face mask can use said external application to modify said at least one program in said face mask.

17. The face mask of claim 16, wherein said at least one program is configured to change an image selected from an image file and displayed on said external display responsive to an input from the user of the face mask, and wherein said at least one program is further configured to modify a voice signal from the user of the face mask prior to inputting said voice signal to said speaker.

18. The face mask of claim 17, wherein said at least one program further comprises an artificial intelligence module, wherein said artificial intelligence module further interprets an output of at least one sensor such that said external display more accurately corresponds to said facial movement of the user of the face mask.

19. The face mask of claim 16, further comprising:
- a video camera on the exterior surface of said face mask in communication with said processor; and
- an internal display on the interior surface of said face mask, wherein the internal display provides images to the user of the face mask and wherein the internal display is in communication with said processor, and wherein said at least one program transfers an output of said video camera to said internal display such that the user of the face mask can view an external environment outside of the face mask.

20. The face mask of claim 19, wherein said external display is selected from a group consisting of: transparent, semi-transparent and one-way transparent.

* * * * *